US011126069B2

(12) United States Patent
Chang et al.

(10) Patent No.: US 11,126,069 B2
(45) Date of Patent: Sep. 21, 2021

(54) PROJECTOR AND OPTICAL MODULE INCLUDING EXTENDING WIRE

(71) Applicant: Coretronic Corporation, Hsin-Chu (TW)

(72) Inventors: Yi Chang, Hsin-Chu (TW); Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/019,568

(22) Filed: Jun. 27, 2018

(65) Prior Publication Data
US 2020/0004123 A1 Jan. 2, 2020

(51) Int. Cl.
*G03B 21/14* (2006.01)
*G03B 21/20* (2006.01)
*G02F 1/09* (2006.01)
*G02B 26/08* (2006.01)

(52) U.S. Cl.
CPC ....... *G03B 21/142* (2013.01); *G02B 26/0875* (2013.01); *G02F 1/091* (2013.01); *G03B 21/206* (2013.01); *G03B 21/2006* (2013.01); *G03B 21/2046* (2013.01)

(58) Field of Classification Search
CPC .. H04N 9/3111; H04N 9/3117; H04N 9/3114; H04N 9/315; G09G 2310/0235; G09G 3/007; G09G 3/00; G03B 21/142; G03B 21/14; G03B 2205/0069; G03B 5/02; G03B 2205/0053; G03B 5/00; G03B 5/04; G02B 26/0875; G02B 27/0933; G02B 26/101
See application file for complete search history.

(56) References Cited

U.S. PATENT DOCUMENTS

| 5,877,806 | A  | * | 3/1999  | Kawano    | G02B 26/0875 348/219.1 |
| 6,753,906 | B2 | * | 6/2004  | Shimada   | G02B 26/0875 348/219.1 |
| 7,447,402 | B2 | * | 11/2008 | Sonoda    | G02B 26/105 385/31 |
| 7,835,053 | B2 | * | 11/2010 | Takemoto  | G02B 26/085 359/207.7 |
| 8,416,481 | B2 | * | 4/2013  | Chikaoka  | G02B 26/101 359/199.1 |
| 9,823,553 | B2 | * | 11/2017 | Mizoguchi | G03B 21/142 |
| 10,281,715 | B2 | * | 5/2019 | Lin       | G02B 26/085 |

(Continued)

FOREIGN PATENT DOCUMENTS

TW   1614778   2/2018

*Primary Examiner* — Bao-Luan Q Le
(74) *Attorney, Agent, or Firm* — JCIPRNET

(57) ABSTRACT

An optical module including a transparent component and at least one coil device is provided. The at least one coil device is connected to the transparent component and includes a main body and at least one extending wire. The at least one extending wire is extended out from the main body, the at least one coil device is adapted to be driven by a magnetic force to vibrate along at least one rotation axis, and a length of the at least one extending wire is in positive correlation with a width of the transparent component along a direction. The direction is perpendicular to the at least one rotation axis and perpendicular to an optical axis of the transparent component. In addition, a projector having the optical module is also provided.

12 Claims, 4 Drawing Sheets

(56) References Cited

U.S. PATENT DOCUMENTS

| | | | |
|---|---|---|---|
| 2003/0146980 A1* | 8/2003 | Shimada | G02B 26/0875 348/218.1 |
| 2004/0085613 A1 | 5/2004 | Lassar | |
| 2005/0264501 A1* | 12/2005 | Choi | G02B 27/0933 345/84 |
| 2006/0138239 A1* | 6/2006 | Sonoda | G02B 19/0014 235/462.38 |
| 2009/0244673 A1* | 10/2009 | Takemoto | G02B 26/085 359/208.1 |
| 2010/0231870 A1* | 9/2010 | Chikaoka | G02B 26/085 353/85 |
| 2016/0363840 A1* | 12/2016 | Mizoguchi | G03B 21/142 |
| 2016/0370575 A1* | 12/2016 | Lin | G02B 26/085 |
| 2017/0299883 A1* | 10/2017 | Nonaka | G02B 27/646 |

* cited by examiner

PROJECTOR AND OPTICAL MODULE INCLUDING EXTENDING WIRE

BACKGROUND

Technical Field

The invention relates to a display device and an optical module thereof, and particularly relates to a projector and an optical module thereof.

Description of Related Art

The projector is a display device for generating a large screen. The imaging principle of a projector includes converting an illumination beam generated by a light source into an image beam via a light valve, and then projecting the image beam on a screen or a wall via a projection lens.

To increase the pixel quality of the projection screen, a pixel offset device is disposed between the light valve and the projection lens of some projectors. In the case of a moving-coil-type pixel offset device, a coil is vibrated by a variation between the coil and a magnet, so as to drive a transparent component to be vibrated. However, due to the vibration of the coil, wires extended out from the coil are easily to be fractured owing to metal fatigue.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projector and an optical module that may prevent wires extended out from a vibrating coil from being fractured.

Other objects and advantages of the invention can be further understood from the technical features disclosed in the invention.

To achieve one or some or all of the objects above or other objects, an embodiment of the invention provides a projector including a light source, a light valve, an optical module, and a projection lens. The light source is adapted to provide an illumination beam. The light valve is located at a transmitting path of the illumination beam and adapted to convert the illumination beam into an image beam. The optical module includes a transparent component and at least one coil device. The transparent component is located at a transmitting path of the image beam. The at least one coil device is connected to the transparent component and includes a main body and at least one extending wire. The at least one extending wire is extended out from the main body, the at least one coil device is adapted to be driven by a magnetic force to vibrate along at least one rotation axis, and a length of the at least one extending wire is in positive correlation with a width of the transparent component along a direction. The direction is perpendicular to the at least one rotation axis and perpendicular to an optical axis of the transparent component. The projection lens is located at the transmitting path of the image beam and adapted to project the image beam out of the projector.

To achieve one or some or all of the objects above or other objects, an embodiment of the invention provides an optical module including a transparent component and at least one coil device. The at least one coil device is connected to the transparent component and includes a main body and at least one extending wire. The at least one extending wire is extended out from the main body, the at least one coil device is adapted to be driven by a magnetic force to vibrate along at least one rotation axis, and a length of the at least one extending wire is in positive correlation with a width of the transparent component along a direction. The direction is perpendicular to the at least one rotation axis and perpendicular to an optical axis of the transparent component.

To achieve one or some or all of the objects above or other objects, an embodiment of the invention provides a projector including a light source, a light valve, an optical module, and a projection lens. The light source is adapted to provide an illumination beam. The light valve is located at a transmitting path of the illumination beam and adapted to convert the illumination beam into an image beam. The optical module includes a transparent component and at least one coil device. The at least one coil device is connected to the transparent component and includes a main body and at least one extending wire. The at least one extending wire is extended out from a position on the main body, the at least one coil device is adapted to be driven by a magnetic force to vibrate along at least one rotation axis. In a direction, a distance between the at least one rotation axis and the position on the main body is equal to or less than quarter a width of the main body, wherein the direction is perpendicular to the at least one rotation axis and perpendicular to an optical axis of the transparent component. The projection lens is located at the transmitting path of the image beam and adapted to project the image beam out of the projector.

To achieve one or some or all of the objects above or other objects, an embodiment of the invention provides an optical module including a transparent component and at least one coil device. The at least one coil device is connected to the transparent component and includes a main body and at least one extending wire. The at least one extending wire is extended out from a position on the main body, the at least one coil device is adapted to be driven by a magnetic force to vibrate along at least one rotation axis. In a direction, a distance between the at least one rotation axis and the position on the main body is equal to or less than quarter a width of the main body, wherein the direction is perpendicular to the at least one rotation axis and perpendicular to an optical axis of the transparent component.

Based on the above, the embodiments of the invention have at least one of the following advantages or efficacies. In the optical module, the larger the width of the transparent component is, the larger the length of the extending wire of the coil device is. Hence, even if the maximum displacement of the transparent component is large due to a large width thereof, the extending wire has a sufficient length to provide an excellent vibration buffering ability, so as to prevent the extending wire from being fractured. In addition, in the coil device, the position (at which the extending wire is extended out from the main body) is located near the rotation axis of the coil device, and the displacement of the coil device at the position is small by doing this, such that the extending wire is prevented from being fatigued or/and fractured.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
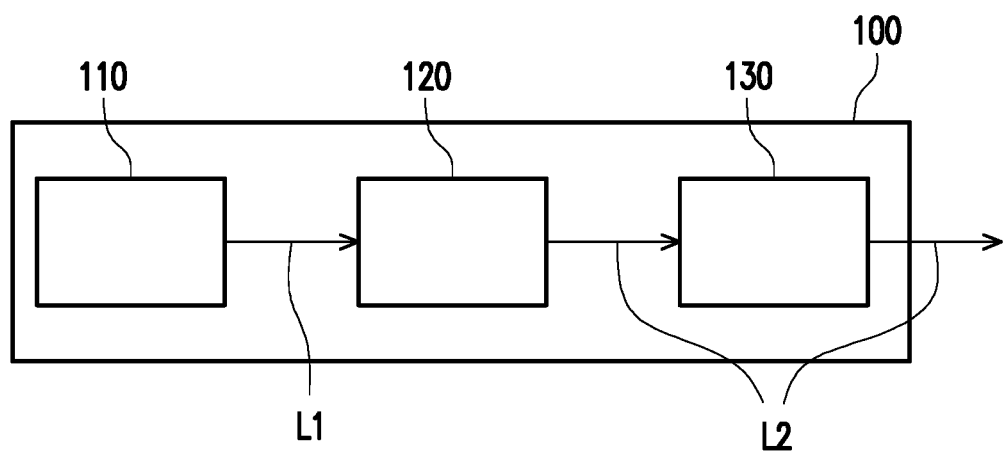
FIG. 1 is a schematic of a projector of an embodiment of the invention.

FIG. 1 is a schematic of a projector of an embodiment of the invention. Referring to FIG. 1, a projector 100 of the embodiment includes a light source 110, a light valve 120, and a projection lens 130. The light source 110 is adapted to provide an illumination beam L1, and the illumination beam L1 is adapted to be guided to the light valve 120. The light valve 120 is, for instance, a digital micro-mirror device (DMD) located/disposed at/on the transmitting path of the illumination beam L1, and adapted to convert the illumination beam L1 into an image beam L2. In some embodiment, the light valve 120 may be liquid crystal display (LCD) panel or liquid crystal on silicon (LCoS), but the invention is not limited thereto. The light valve 120 is adapted to reflect the image beam L2 to the projection lens 130. The projection lens 130 is located/disposed at/on the transmitting path of the image beam L2, and is adapted to project the image beam L2 out of/from the projector 100.

Figure 2:
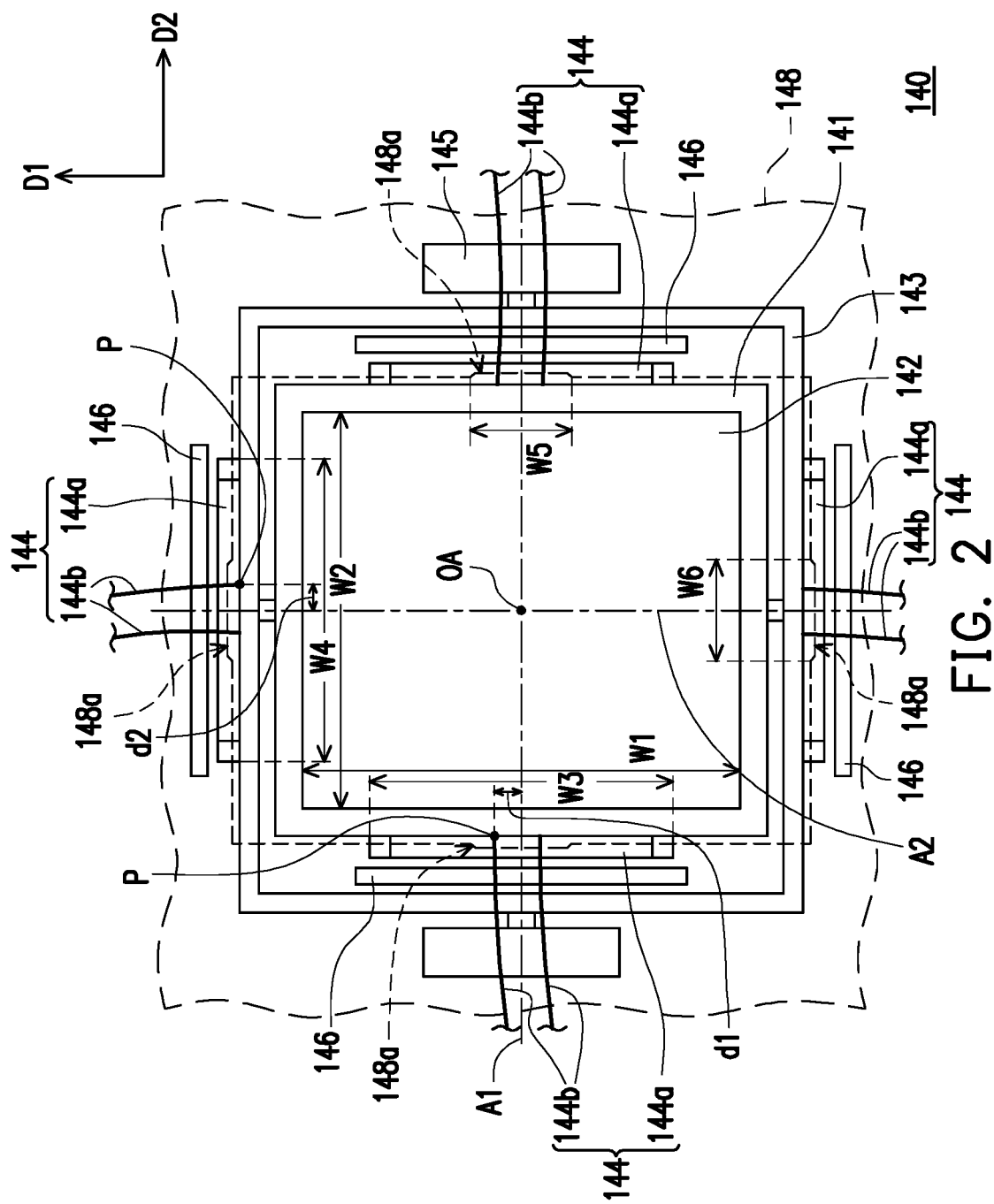
FIG. 2 is a top view of an optical module of the projector of FIG. 1.

FIG. 2 is a top view of an optical module of the projector of FIG. 1. Referring to FIG. 2, the projector 100 (as shown in FIG. 1) further includes an optical module 140. The optical module 140 includes a transparent component 142 and at least one coil device 144 (four coil devices 144 are shown in FIG. 2 for example). In one embodiment, the transparent component 142 may be disposed between the light valve 120 (as shown in FIG. 1) and the lens 130 (as shown in FIG. 1), but the invention is not limited thereto. In one embodiment, the transparent component 142 may be disposed between the light source 110 (as shown in FIG. 1) and the light valve 120 (as shown in FIG. 1), but the invention is not limited thereto. The transparent component 142 is located at/on the transmitting path of the image beam L2 (as shown in FIG. 1). The optical module 140 further includes at least one magnetic component 146 (four magnetic components 146 are shown in FIG. 2 for example). The magnetic components 146 are aligned to the coil devices 144 respectively. The coil devices 144 are connected to the transparent component 142, and each coil device 144 includes a main body 144a and at least one extending wire 144b (two extending wires 144b for example). In the embodiment, each of the extending wires 144b is extended out from a position P (two of the positions P are labeled in FIG. 2 for example) on the corresponding main body 144a. In one embodiment, the position P may be the center position of the main body 144a, but the invention is not limited thereto. In one embodiment, the position P may be the position near the center position of the main body 144a, but the invention is not limited thereto.

In the embodiment, two of the coil devices 144 (e.g. the coil device 144 at the upper side and the coil device 144 at the lower side in FIG. 2) are adapted to be driven by magnetic forces generated between the corresponding magnetic components 146 and the two coil devices 144 to vibrate along a rotation axis A1, and another two of the coil devices 144 (e.g. the coil device 144 at the right side and the coil device 144 at the left side in FIG. 2) are adapted to be driven by magnetic forces generated between the corresponding magnetic components 146 and the two coil devices 144 to vibrate along a rotation axis A2 perpendicular to the rotation axis A1. The transparent component 142 is adapted to be driven (e.g. to be vibrated) by the coil devices 144. By doing this, the image beam L2 passing through the transparent component 142 offsets correspondingly, such that the pixels offset back and forth to increase the resolution of the projection image.

In the embodiment, a length of each of two of the extending wires 144b (e.g. the coil device 144 at the right side or/and the coil device 144 at the left side in FIG. 2) is in positive correlation with a width W1 of the transparent component 142 along a direction D1, wherein the direction D1 is perpendicular to the rotation axis A1 and perpendicular to an optical axis OA of the transparent component 142. Similarly, a length of each of another two of the extending wires 144b (e.g. the coil device 144 at the upper side or/and the coil device 144 at the lower side in FIG. 2) is in positive correlation with a width W2 of the transparent component 142 along a direction D2, wherein the direction D2 is perpendicular to the rotation axis A2 and perpendicular to an optical axis OA of the transparent component 142. That is, the larger the width of the transparent component 142 is, the larger each length of the extending wires 144b of the coil device 140 is. Hence, even if the maximum displacement of the transparent component 142 is large due to a large width thereof, the extending wires 144b have sufficient lengths to provide excellent vibration buffering abilities, so as to prevent the extending wires 144b from being fractured.

In the embodiment, the length of the extending wire 144b is, for example, larger than fifty times a maximum displacement (vibration displacement) of the transparent component 142. However, the invention is not limited thereto. In the embodiment, a direction of the vibration displacement of the transparent component 142 is not parallel to the direction D1/direction D2. In the embodiment, a direction of the vibration displacement of the transparent component 142 is substantially perpendicular to the direction D1 and the direction D2. In the embodiment, the vibration displacement is, for example, 60 μm or 70 μm, but the invention is not limited thereto. In the embodiment, the length of the extending wire 144b is, for example, 15 mm, but the invention is not limited thereto.

In addition, in the direction D1, a distance d1 between the rotation axis A1 and the position P on the corresponding main body 144a is equal to or less than quarter a width W3 of the main body 144a. Similarly, in the direction D2, a distance d2 between the rotation axis A2 and the position P on the corresponding main body 144a is equal to or less than quarter a width W4 of the main body 144a. That is, in each of the coil devices 144, the position P (at which the extending wire 144b is extended out from the main body 144a) is located near the rotation axis (e.g. rotation axis A1/A2) of the coil device 144, and the displacement of the coil device 144 at the position P is small by doing this, such that the extending wire 144b is prevented from being fatigued or/and fractured, therefore the operating/working duration time of the extending wire 144b may be increased. In the embodiment, the displacement of the coil device 144 at the position P is equal to half a width W3 or/and width W4 of the main body 144a.

In the embodiment, the distance d1 between the rotation axis A1 and the position P on the main body 144a is equal to or less than one-eighth the width W3, and the distance d2 between the rotation axis A2 and the position P on the main body 144a is equal to or less than one-eighth the width W4. However, the invention is not limited thereto.

Figure 3:
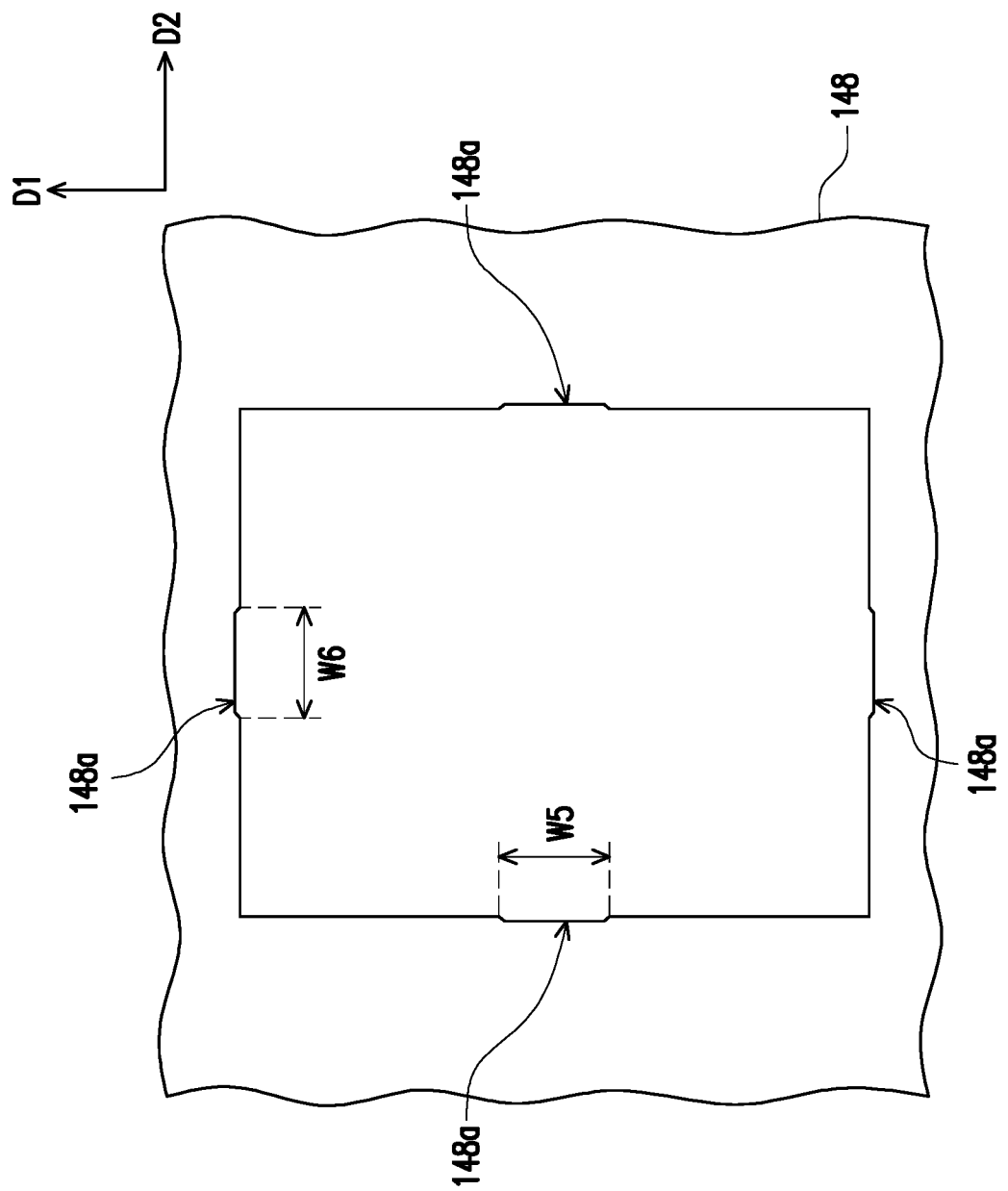
FIG. 3 is a top view of a circuit board of the optical module in FIG. 2.

FIG. 3 is a top view of a circuit board of the optical module in FIG. 2. Referring to FIG. 2 and FIG. 3, the optical module 140 further includes a circuit board 148. The circuit board 148 has at least one notche 148a (four notches 148a are shown in FIG. 2 and FIG. 3 for example), the notches 148a are aligned to the coil devices 144 respectively, and each of the extending wires 144b is extended through the corresponding notch 148a and connected to the circuit board 148. Accordingly, each of the extending wires 144b is arranged well by the corresponding notch 148a, so as to prevent the extending wires 144b from being twisted unexpectedly while the coil devices 144 are vibrated, and to prevent the extending wires 144b and the circuit board 148 from being scraped with each other unexpectedly to further avoid breaking the coil devices 144.

In the embodiment, in the direction D1, a width W5 of each of the notches 148a (e.g. the notch 148a at the right side or/and the notch 148a at the left side in FIG. 2 and FIG. 3) is equal to or less than half a width W3 of the main body 144a. Similarly, in the direction D2, a width W6 of each of the notches 148a (e.g. the notch 148a at the upper side or/and the notch 148a at the lower side in FIG. 2 and FIG. 3) is equal to or less than half a width W4 of the main body 144a. However, the invention is not limited thereto.

Referring to FIG. 2, the optical module 140 of the embodiment further includes a first frame 141, a second frame 143, and a base 145 for assembling the coil devices 144 and the transparent component 142. Particularly, the transparent component 142 and two of the coil devices 144 are disposed on the first frame 141, the first frame 141 and the second frame 143 are pivoted to each other along the rotation axis A2, another two of the coil devices 144 are disposed on the second frame 143, and the second frame 143 is pivoted to the base 145 along the rotation axis A1. Accordingly, when the magnetic force is generated between each of the coil devices 144 and the corresponding magnetic component 146, the two coil devices 144 disposed on the second frame 143 are able to vibrate along the rotation axis A1 through the pivot between the base 145 and the second frame 143, and the two coil devices 144 disposed on the first frame 141 are able to vibrate along the rotation axis A2 through the pivot between the first frame 141 and the second frame 143.

In the embodiment, the optical module 140 may include glues, the glues are adhered on one end or two ends of each of the extending wires 144b, so as to further prevent the extending wires 144b from being fractured at the ends thereof.

Figure 4:
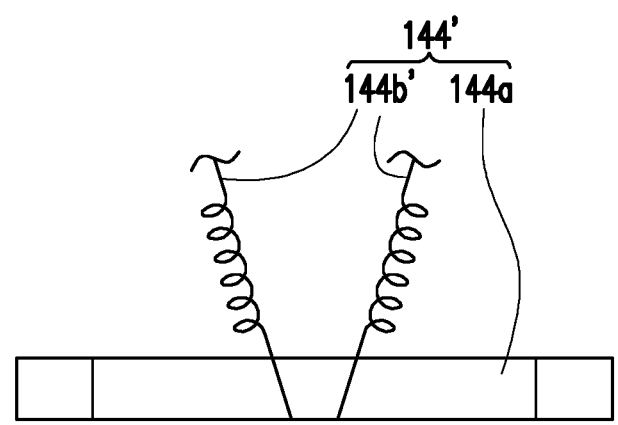
FIG. 4 is a top view of a coil device of another embodiment of the invention.

FIG. 4 is a top view of a coil device of another embodiment of the invention. The difference between the coil device 144' in FIG. 4 and the coil device 144 in FIG. 2 is that, each of the extending wires 144b' is a spiral wire. In other embodiments, the extending wires could be other types, such as stranded wires (not shown), etc., and the invention is not limited thereto. Thus, the actual length of each of the extending wires 144b' is able to be increased through different designs.

In summary, the embodiments of the invention have at least one of the following advantages or efficacies. In the optical module, the larger the width of the transparent component is, the larger the length of the extending wire of the coil device is. Hence, even if the maximum displacement of the transparent component is large due to a large width thereof, the extending wire has a sufficient length to provide an excellent vibration buffering ability, so as to prevent the extending wire from being fractured. In addition, in the coil device, the position (at which the extending wire is extended out from the main body) is located near the rotation axis of the coil device, and the displacement of the coil device at the position is small by doing this, such that the extending wire is prevented from being fatigued or/and fractured.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
    a light source, adapted to provide an illumination beam;
    a light valve, located at a transmitting path of the illumination beam and adapted to convert the illumination beam into an image beam;
    an optical module, comprising:
        a first frame;
        a transparent component, located at a transmitting path of the image beam; and
        at least one coil device, connected to the transparent component and comprises a main body and at least one extending wire, wherein the transparent component is disposed on the first frame, and the whole main body of the at least one coil device is disposed at a lateral side of the first frame, wherein the at least one extending wire is extended out from a position on the corresponding main body, the position corresponds to the same lateral side of the first frame, and the position on the main body is located at a center position of the main body or near the center position of the main body, the at least one coil device is adapted to be driven by a magnetic force to vibrate along at least one rotation axis, and a length of the at least one extending wire is in positive correlation with a width of the transparent component along a direction, wherein the direction is perpendicular to the at least one rotation axis and perpendicular to an optical axis of the transparent component; and
    a projection lens, located at the transmitting path of the image beam and adapted to project the image beam out of the projector,
    wherein an amount of the at least one coil device is plural, an amount of the at least one rotation axis is two, and at least one of the coil devices and at least another one of the coil devices are adapted to vibrate respectively along the two rotation axes perpendicular to each other,
    wherein the optical module further comprises a second frame, a base and a plurality of magnetic components, wherein the first frame and the second frame are pivoted to each other along one of the rotation axes, at least one of the coil devices is disposed on the first frame, at least another one of the coil devices is disposed on the second frame, and the second frame is pivoted to the base along another one of the rotation axes,
    wherein the whole main body and the at least one extending wire of the at least one of the coil devices are disposed on a lateral surface of the first frame, at least one of the plurality of magnetic components is aligned to the at least one of the coil devices, and the whole main body of the at least one of the coil devices and the at least one of the plurality of magnetic components are located between the lateral surface of the first frame and the second frame,
    wherein the whole main body and the at least one extending wire of the at least another one of the coil devices are disposed on a lateral surface of the second frame, at least another one of the plurality of magnetic components is aligned to the at least another one of the coil devices, and the whole main body of the at least another one of the coil devices and the at least another one of the plurality magnetic components are disposed external to the second frame.

2. The projector according to claim 1, wherein the length of the at least one extending wire is larger than fifty times a maximum displacement of the transparent component.

3. The projector according to claim 1, wherein the optical module further comprises a circuit board, the circuit board has a plurality of notches, and each notch is aligned to one of the coil devices, and the at least one extending wire of the one of the coil devices is extended through the corresponding notch and connected to the circuit board, wherein in the direction perpendicular to the rotation axis of the one of the coil devices and the optical axis, a width of the corresponding notch is equal to or less than half a width of the main body of the one of the coil devices.

4. An optical module, comprising:
    a first frame;
    a transparent component; and
    at least one coil device, connected to the transparent component and comprises a main body and at least one extending wire, wherein the transparent component is disposed on the first frame, and the whole main body of the at least one coil device is disposed at a lateral side of the first frame, wherein the at least one extending wire is extended out from a position on the corresponding main body, the position corresponds to the same lateral side of the first frame, and the position on the main body is located at a center position of the main body or near the center position of the main body, the at least one coil device is adapted to be driven by a magnetic force to vibrate along at least one rotation axis, and a length of the at least one extending wire is in positive correlation with a width of the transparent component along a direction, wherein the direction is perpendicular to the at least one rotation axis and perpendicular to an optical axis of the transparent component,
    wherein an amount of the at least one coil device is plural, an amount of the at least one rotation axis is two, and at least one of the coil devices and at least another one of the coil devices are adapted to vibrate respectively along the two rotation axes perpendicular to each other,
    wherein the optical module further comprises a second frame, a base and a plurality of magnetic components, wherein the first frame and the second frame are pivoted to each other along one of the rotation axes, at least one of the coil devices is disposed on the first frame, at least another one of the coil devices is disposed on the second frame, and the second frame is pivoted to the base along another one of the rotation axes, wherein the whole main body and the at least one extending wire of the at least one of the coil devices are disposed on a lateral surface of the first frame, at least one of the plurality of magnetic components is aligned to the at least one of the coil devices, and the whole main body of the at least one of the coil devices and the at least one of the plurality of magnetic components are located between the lateral surface of the first frame and the second frame, wherein the whole main body and the at least one extending wire of the at least another one of the coil devices are disposed on a lateral surface of the second frame, at least another one of the plurality of magnetic components is aligned to the at least another one of the coil devices, and the whole main body of the at least another one of the coil devices and the at least another one of the plurality magnetic components are disposed external to the second frame.

5. The optical module according to claim 4, wherein the length of the at least one extending wire is larger than fifty times a maximum displacement of the transparent component.

6. The optical module according to claim 4, further comprising a circuit board, wherein the circuit board has a plurality of notches, and each notch is aligned to one of the coil devices, and the at least one extending wire of the one of the coil devices is extended through the corresponding notch and connected to the circuit board, wherein in the direction perpendicular to the rotation axis of the one of the coil devices and the optical axis, a width of the corresponding notch is equal to or less than half a width of the main body of the one of the coil devices.

7. A projector, comprising:
a light source, adapted to provide an illumination beam;
a light valve, located at a transmitting path of the illumination beam and adapted to convert the illumination beam into an image beam;
an optical module, comprising:
a first frame;
a transparent component, located at a transmitting path of the image beam; and
at least one coil device, connected to the transparent component and comprises a main body and at least one extending wire, wherein the transparent component is disposed on the first frame, and the whole main body of the at least one coil device is disposed at a lateral side of the first frame, wherein the at least one extending wire is extended out from a position on the corresponding main body, the position corresponds to the same lateral side of the first frame, and the position on the main body is located at a center position of the main body or near the center position of the main body, the at least one coil device is adapted to be driven by a magnetic force to vibrate along at least one rotation axis, wherein in a direction, a distance between the at least one rotation axis and the position on the main body is equal to or less than quarter a width of the main body, and the direction is perpendicular to the at least one rotation axis and perpendicular to an optical axis of the transparent component,
wherein an amount of the at least one coil device is plural, an amount of the at least one rotation axis is two, and at least one of the coil devices and at least another one of the coil devices are adapted to vibrate respectively along the two rotation axes perpendicular to each other,
wherein the optical module further comprises a second frame, a base and a plurality of magnetic components, wherein the first frame and the second frame are pivoted to each other along one of the rotation axes, at least one of the coil devices is disposed on the first frame, at least another one of the coil devices is disposed on the second frame, and the second frame is pivoted to the base along another one of the rotation axes,
wherein the whole main body and the at least one extending wire of the at least one of the coil devices are disposed on a lateral surface of the first frame, at least one of the plurality of magnetic components is aligned to the at least one of the coil devices, and the whole main body of the at least one of the coil devices and the at least one of the plurality of magnetic components are located between the lateral surface of the first frame and the second frame,
wherein the whole main body and the at least one extending wire of the at least another one of the coil devices are disposed on a lateral surface of the second frame, at least another one of the plurality of magnetic components is aligned to the at least another one of the coil devices, and the whole main body of the at least another one of the coil devices and the at least another one of the plurality magnetic components are disposed external to the second frame; and
a projection lens, located at the transmitting path of the image beam and adapted to project the image beam out of the projector.

8. The projector according to claim 7, wherein in the direction perpendicular to the at least one rotation axis and the optical axis, the distance between the at least one rotation axis and the position on the main body is equal to or less than one-eighth the width of the main body.

9. The projector according to claim 7, wherein the optical module further comprises a circuit board, the circuit board has a plurality of notches, and each notch is aligned to one of the coil devices, and the at least one extending wire of the one of the coil devices is extended through the corresponding notch and connected to the circuit board, wherein in the direction perpendicular to the rotation axis of the one of the coil devices and the optical axis, a width of the corresponding notch is equal to or less than half a width of the main body of the one of the coil devices.

10. An optical module, comprising:
a first frame;
a transparent component; and
at least one coil device, connected to the transparent component and comprises a main body and at least one extending wire, wherein the transparent component is disposed on the first frame, and the whole main body of the at least one coil device is disposed at a lateral side of the first frame, wherein the at least one extending wire is extended out from a position on the corresponding main body, the position corresponds to the same lateral side of the first frame, and the position on the main body is located at a center position of the main body or near the center position of the main body, the at least one coil device is adapted to be driven by a magnetic force to vibrate along at least one rotation axis, wherein in a direction, a distance between the at least one rotation axis and the position on the main body is equal to or less than quarter a width of the main body, and the direction is perpendicular to the at least one rotation axis and perpendicular to an optical axis of the transparent component, wherein an amount of the at least one coil device is plural, an amount of the at least one rotation axis is two, and at least one of the coil devices and at least another one of the coil devices are adapted to vibrate respectively along the two rotation axes perpendicular to each other, wherein the optical module further comprises a second frame, a base and a plurality of magnetic components, wherein the first frame and the second frame are pivoted to each other along one of the rotation axes, at least one of the coil devices is disposed on the first frame, at least another one of the coil devices is disposed on the second frame, and the second frame is pivoted to the base along another one of the rotation axes, wherein the whole main body and the at least one extending wire of the at least one of the coil devices are disposed on a lateral surface of the first frame, at least one of the plurality of magnetic components is aligned to the at least one of the coil devices, and the whole main body of the at least one of the coil devices and the at least one of the plurality of magnetic components are located between the lateral surface of the first frame and the second frame, wherein the whole main body and the at least one extending wire of the at least another one of the coil devices are disposed on a lateral surface of the second frame, at least another one of the plurality of magnetic components is aligned to the at least another one of the coil devices, and the whole main body of the at least another one of the coil devices and the at least another one of the plurality magnetic components are disposed external to the second frame.

11. The optical module according to claim 10, wherein in the direction perpendicular to the at least one rotation axis and the optical axis, the distance between the at least one rotation axis and the position on the main body is equal to or less than one-eighth the width of the main body.

12. The optical module according to claim 10, further comprising a circuit board, wherein the circuit board has a plurality of notches, and each notch is aligned to one of the coil devices, and the at least one extending wire of the one of the coil devices is extended through the corresponding notch and connected to the circuit board, wherein in the direction perpendicular to the rotation axis of the one of the coil devices and the optical axis, a width of the corresponding notch is equal to or less than half a width of the main body of the one of the coil devices.

* * * * *